Nov. 17, 1959  J. GENEVAY  2,913,538
AUTOMATICALLY REPEATING TALKING MACHINE
Filed Oct. 11, 1957  3 Sheets-Sheet 1

INVENTOR
JACQUES GENEVAY.
By Irwin S. Thompson
ATTY.

Nov. 17, 1959  J. GENEVAY  2,913,538
AUTOMATICALLY REPEATING TALKING MACHINE
Filed Oct. 11, 1957  3 Sheets-Sheet 3
Fig. 4
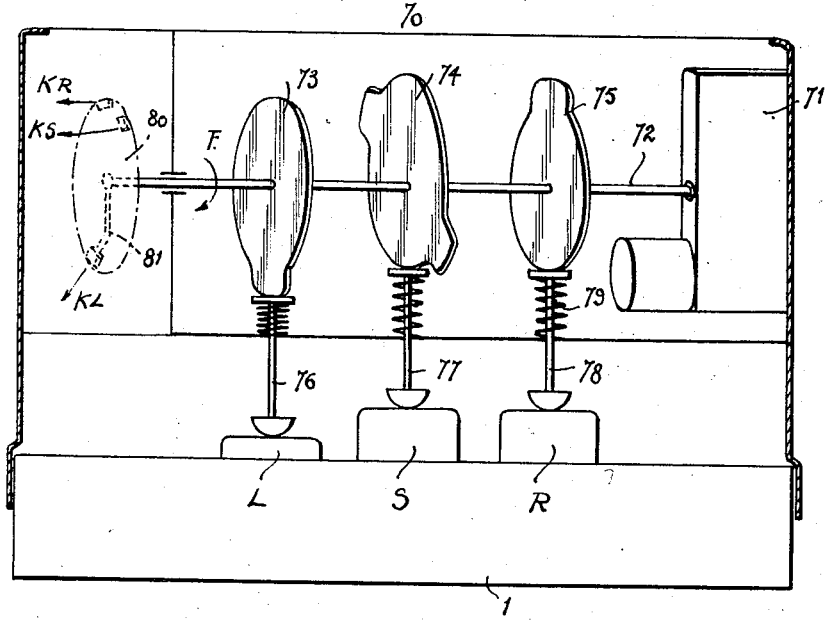
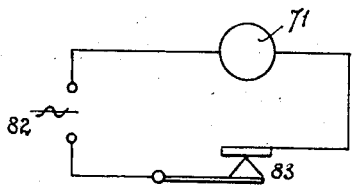
Fig. 5
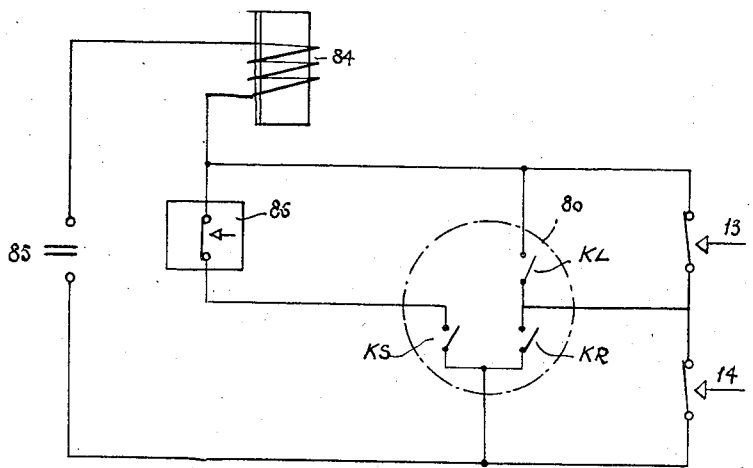
INVENTOR
JACQUES GENEVAY
BY Irwin S. Thompson
ATTY.

2,913,538
AUTOMATICALLY REPEATING TALKING MACHINE

Jacques Genevay, Paris, France

Application October 11, 1957, Serial No. 689,536

Claims priority, application France October 16, 1956

6 Claims. (Cl. 179—100.2)

My invention has for its object an automatically repeating talking machine adapted to repeatedly reproduce a given sound record during a predetermined duration, without the operator having to interfere.

Machines and arrangements have already been proposed and tested for such a purpose with a view to various and numerous teaching and psychological applications such as the teaching of languages, the preparation of examinations, the re-education of deficient manners of talking, the formation of radio-operators, learning during one's sleep, advertising by sound, etc.

One of such known apparatus is constituted by a talking machine the reading arm of which is automatically returned after it has swept over a more or less considerable fraction of a record into its starting position at the periphery of said record; the phonograph is associated with a chronometric circuit-breaker which starts automatically the reading operation at a number of predetermined moments corresponding to as many electrical switches, say every quarter of an hour, starting at a predetermined moment and finishing at another predetermined moment.

It is therefore necessary with such an apparatus to make the chronometric circuit-breaker produce a signal at the beginning of each repetition of the fraction of a record to be reproduced. Said record should be previously produced on a conventional disc-shaped carrier, i.e. in a permanent nonreversible manner which reduces the adaptability of the apparatus.

Other known apparatus intended more particularly for advertising purposes use records made on magnetic strips or wires or on talking films instead of disc-shaped phonograph records.

In one apparatus of this latter type, the record carrier progresses alternately in one direction for reading and in the opposite direction without any reading, the reversal of direction being performed automatically and through mechanical means as soon as the last convolution or convolutions of the strip or wire have left the core of the feed spool. A comparatively compound and intricate mechanism is thus required and the duration of each cycle of operation is of necessity defined by the length of the record carrier used.

In another kind of apparatus of this type, the end of each reproduction is defined by the production of a corresponding signal obtained either mechanically through a projecting part provided to this end on the record-carrying strip or again through electric means as provided by the insertion on said strip of an element conductive of electricity and adapted to close the circuit of a relay producing the desired signal. In this case again however, as in that of the phonograph referred to hereinabove, a time signal is required for the release and starting of each elementary repeating cycle.

My invention has for its object a novel talking machine devoid of the drawback which has just been mentioned and allowing the automatic repetition of a predetermined sound record with a great adaptability, without any loss of time and through particularly simple and economical means, this repetition being provided during one or more periods of a predetermined adjustable duration.

The machine according to my invention includes in combination a magnetophone and a chronometric circuit-breaker adapted to ensure the starting and stopping of said magnetophone at predetermined adjustable moments and it is remarkable chiefly through the association with the magnetophone of means for releasing automatically the return movement of the record carrier under the action of a signal corresponding to the end of the repeating operation and of further means for automatically starting the reading stage under the action of a starting signal.

Through this arrangement, the chronometric circuit-breaker has to ensure merely the starting and the stopping of the magnetophone at the beginning and at the end of each complete operative period. Throughout the duration of such a period, any record whatever may be repeated at a rhythm defined by the actual duration of said record, provided however the signals at the beginning and at the end are transmitted respectively before the beginning and after the end of said record, which is an easy matter in practice. The starting and terminal signals may be performed in various manners.

Thus, for instance, in the case of magnetophones equipped with metering means provided with a movable slider the shifting of which is controlled by the progression of a record carrier, it is possible to use, according to my invention, two switches the positions of which are adjusted separately on a support arranged in registry with the path of said slider, so as to be closed by the latter upon engagement therewith.

According to modifications, the signals corresponding to the beginning and to the end of the reproduction of a record fraction may be obtained through the actual record carrier, say through a localized change in the electric conductivity of said carrier or through the production by said carrier of a signal having a characteristic distinctive frequency. In the first case, the signal is constituted by the breaking or making of a circuit including two contact-pieces adapted to sweep the carrier. If said carrier is constituted by a wire, said circuit should be normally closed so as to be interrupted by the passage in registry with one of said contact-pieces of a wire section provided with an insulating coat; in contradistinction, if the carrier is made of a material which is not electrically conductive, said circuit is normally open and is closed by the passage of an area of said carrier which is made conductive through the application of a section of a ribbon the outer surface of which is coated with a metal layer.

In the second case to be considered, the characteristic frequency signal read on the carrier by the reading head will act through the agency of a circuit or of selective means tuned to said frequency.

The features and advantages of my invention will appear more clearly from the reading of the following description given by way of an exemplification, reference being made to the accompanying drawings wherein.

Fig. 4 is an elevational diagrammatic illustration of a control-bridge equipping a machine according to my invention incorporating a magnetophone of the type in the which the starting of the different operations is performed by means of keys the operation of which requires the application of comparatively large stresses; there is provided as a matter of fact in such a case, according to a particular feature of my invention, an automatic control-bridge extending over the key-board of the magnetophone and including a push member lying above each key to be controlled, a camshaft driven by a control-motor and carrying a cam controlling each push member and a contact-maker driven by said camshaft and adapted to close or to open selectively switches associated with the cams.

Fig. 5 is a wiring diagram for the automatic control of said bridge.

Figure 1:
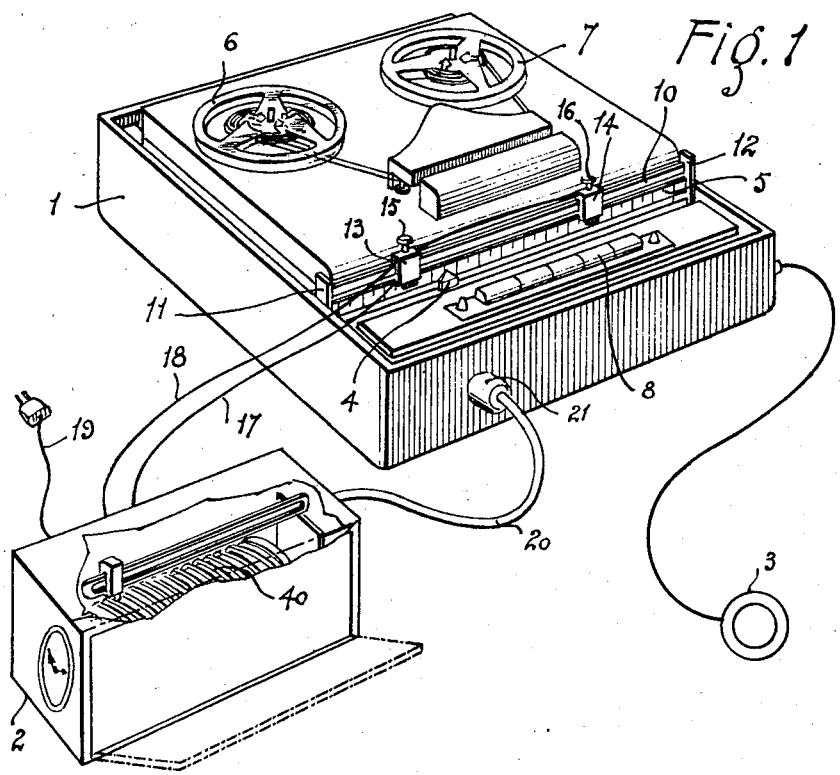
Fig. 1 is a simplified perspective view of an embodiment of a machine according to my invention and incorporating a magnetophone of the type in which the release of the different operations is performed through corresponding relays.
Figure 2:
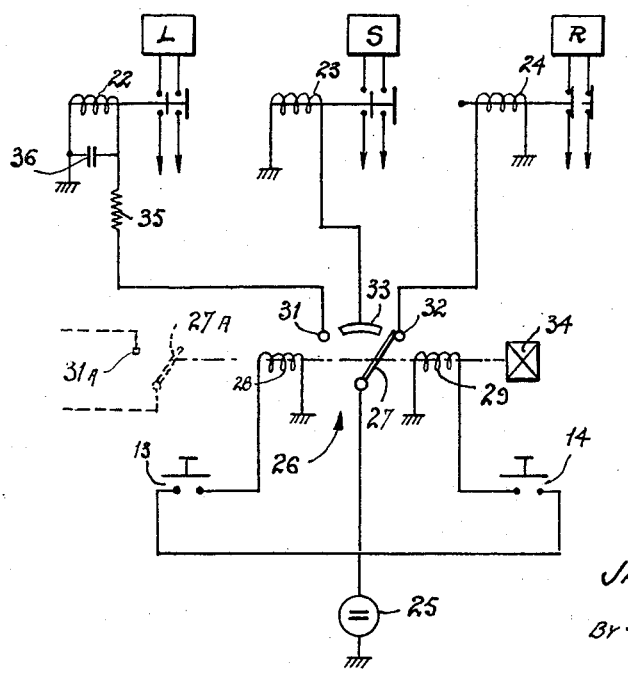
Fig. 2 is a wiring diagram of an automatic control system for such a machine.

In the embodiment illustrated by way of example in Figs. 1 and 2, a machine executed according to my invention includes, in combination, a magnetophone 1, a control-box 2, enclosing a chronometric circuit-breaker and a diffusor 3.

The magnetophone forming a part of said machine is of a known type including a sort of meter constituted by a slider 4 moving over a scale 5 by a linear progression proportional to the unwinding of the magnetic record strip; this progression is performed from the left-hand side to the right-hand side when said strip winds off the feed spool 6, during a reading stage for instance, and is wound over the then driven spool 7, while said progression proceeds from the right to the left during the return movement providing preferably at a high speed for the rewinding of the magnetic strip over the spool 6 which is driven in its turn. The different operations of the magnetophone are normally controlled by a keyboard 8 including one key for each operation of a given type.

To make the machine operate in accordance with my invention, there is arranged above the meter and in parallelism with the scale 5 a rule 10 which is secured, for instance, by means of two clamping flanges 11 and 12 to the corresponding lateral surfaces of the plate of the magnetophone. Said rule 10 forms a slideway carrying two switches 13 and 14, controlled by push-members, said switches being adjustably secured to the slideway by corresponding locking screws 15 and 16 in the desired positions above the scale 5. The switches are designed so as to close a corresponding circuit whenever the slider 4 registers with the corresponding push-members. Said switches are connected through flexible cables 17 and 18 with the control-box 2 from which project a cable 19, adapted to connect said control box with the main supply of electric current, and a cable 20 leading to a connecting member 21 fitted on the case of the magnetophone 1.

The diagram of Fig. 2 shows at L, S and R the circuits providing for the reading, stopping and returning stages respectively. It will be assumed that the closing of said circuits is controlled by the corresponding relays 22, 23, 24 which are fed selectively by a suitable supply of electric current 25 through the agency of a reversing and selecting switch 26, the contact-making lever of which is subjected on the one hand to the action of return springs, which are not illustrated, and which hold it fast in either of two positions of stable equilibrium corresponding respectively to the closing of the circuit on either of the stationary contact-pieces 31, 32, while said lever 27 is subjected on the other hand to the action of two solenoids 28 and 29 the energization of which produces the rocking movement of said lever 27 from one of said contact-pieces 31 and 32 onto the other, with a transient engagement with the intermediate contact-piece 33.

The windings of the solenoids 28 and 29 are connected selectively across the terminals of the supply 25 through the switches 13 and 14 controlled by push-members as described hereinabove.

The rocking movement of the contact-making lever 27 may possibly be slowed down through the braking means illustrated diagrammatically at 34. Furthermore, or as a modification, a resistance 35 and a condenser 36 may be inserted in the circuit of the relay 22 controlling the reading operation so as to introduce a certain lag in the operation of said relay and to slow down consequently the establishment of a voltage across its terminals.

According to the type of magnetophone used, all or only a fraction of said automatic control system is incorporated inside the control-box 2 (Fig. 1) and connected with the magnetophone through the cable 20 and the connector 21.

The connection with the main supply of electric current 25 of the system constituted by the magnetophone 1 and the control-box 2 is ensured during predetermined durations by the chronometric circuit-breaker 40 housed inside the control-box 2 and of which one embodiment is described hereinafter with further detail. Delaying means of any known type, which are not illustrated, may be associated with the control-box so as to delay the application of the voltage from the supply 25, and thereby make sure that the automatic control remains inoperative during the time required for establishing normal conditions of operation of the magnetophone.

The automatic control-system thus constituted operates as follows:

It is assumed that the strip carried by the magnetophone carries a record extending between a starting point and a final point corresponding to two well-defined positions of the slider 4 (Fig. 1) and that the starting switch 13 has been positioned slightly to the left-hand side of the position of the slider corresponding to the starting point of the record and the terminal switch 14 slightly to the right-hand side of the position of the slider corresponding to the terminal point of the record.

It will be assumed for instance that, at the moment at which the chronometric circuit-breaker connects the different parts of the machine with the main supply 25, the automatic control means are in the position corresponding to Fig. 2, i.e., the contact-making lever 27 of the reversing switch 26 is in contact with the contact-piece 32, so that the relay 24 is energized and closes the circuit corresponding to the return or rewinding operation. The record strip is wound consequently back over the feed spool 6 (Fig. 1) and the slider 4 is returned at a high speed towards its left-hand position. After it has passed beyond the starting point of the record, as defined on the scale 5, the slider engages the push-member controlling the starting switch 13 so as to close the circuit feeding the solenoid 28. The latter produces then a rocking movement of the lever 27 which engages consequently the other contact-piece 31.

As it passes over the intermediate contact-piece 33, the lever 27 energizes the relay 23 controlling the stop operation, i.e. the braking of the strip so that the latter has stopped or practically stopped at the moment of the closing of the circuit feeding the reading relay 22 by the contact-piece 31. As already mentioned, the operation of last-mentioned relay 22 may be still further delayed, if required, by means of the resistance 35 and condenser 36; when the reading operation has been started, the strip passes normally underneath the reading head while the slider 4 moves away from the starting switch 13 towards the right-hand side of the rule 5. After complete reading of the record or record section, the slider engages the push-member controlling the terminal switch 14 and closes the corresponding circuit. The solenoid 29 is re-energized and causes the contact-making lever 27 to return onto the contact-piece 32. As the lever 27 passes transiently over the intermediate contact-piece 33, the strip is stopped and when the lever energizes the return relay 24, the return operation is again released and the cycle already described begins over again.

The operation continues thus repeatedly until the chronometric circuit-breaker interferes again so as to disconnect the machine from the main supply 25 through an opening of the general switch.

It may be of advantage to delay the opening of the general switch during the time required for finishing a reading operation which has already begun. This delay may be easily produced, for instance, by connecting in parallel with the general switch a holding switch constituted for instance (Fig. 2) by an auxiliary contact-piece 31A and a second contact-making lever 27A which is associated with the lever 27 of the reversing switch 26.

When the chronometric circuit-breaker opens the general switch while a reading is being performed, said holding switch at 31A ensures the feeding of the machine until the reading is at an end and the closing of the terminal switch 14 provides for a rocking movement of the reversing switch 26 so as to start the return operation, associated with an opening of the holding switch.

It will be readily understood that in a further modification of the closing of the contact-piece at the beginning and at the end of the record respectively at 13 and 14 may be effected by the use of two spaced parts, provided with an electrically conductive coat, cooperating with a sweeping contact-piece whereby the successive circuit closing provides control for the alternate rocking movement of the reversing and selecting switch 26. It is readily apparent furthermore that said rocking movement may also be produced by the detection through the agency of the reading head of the magnetophone of two signals of a characteristic and distinctive frequency, which signals have been previously recorded on the record carrier respectively before the starting point and after the end of the record to be repeated. These modifications which resort to means which are technically known per se need not be described with any further detail since they will be well understood by any one skilled in the art.

Figure 3:
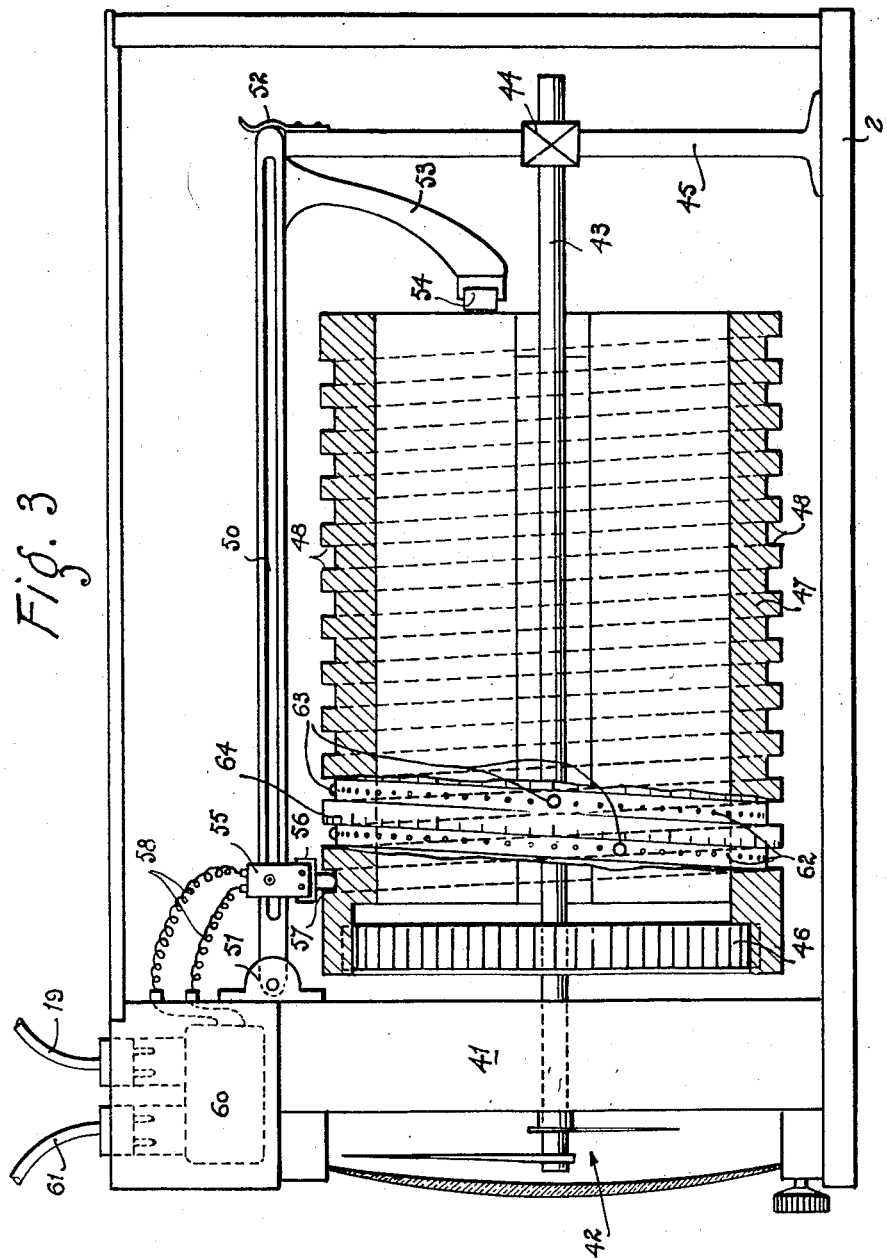
Fig. 3 is a diagrammatic longitudinal sectional view of a preferred embodiment of a chronometric circuit-breaker, said embodiment being of a particular interest through its ready applicability to the accurate definition of the duties of the machine described.

I will now describe with reference to Fig. 3 a preferred embodiment of the chronometric circuit-breaker which allows, under small bulk conditions and through comparatively simple means, for any desired timing of operation with a maximum adaptability and accuracy.

A clockwork 41 (Fig. 3) includes, in addition to a conventional hour dial 42 arranged on a front wall of the control-box 2, a shaft 43 driven at the speed of one revolution per hour, the end of said shaft, which is remote from the clockwork mechanism, being carried inside a ball bearing device 44 arranged inside a carrier plate 45 provided for this purpose inside the box 2.

To the shaft 43 is keyed a driving wheel 46 which is notched or toothed; said shaft is rigid with a drum 47 carrying on its left-hand side a series of teeth adapted to cooperate with the wheel 46 and provided on its outer cylindrical surface with a helical groove 48 forming twelve constant pitch convolutions. A rail 50 is arranged in parallelism with a generating line of said drum and at a small distance from the latter, said rail 50 having its left-hand end pivotally secured at 51 to the frame of the clockwork 41, in Fig. 3 of the drawings, while its right-hand end bearing on the carrier plate 45 is held in position on the latter by a spring 52. The rail 50 is provided with an arm 53 adapted to engage, through the agency of a roller 54, the rear end of the drum 47, so as to ensure the engagement of said drum with the teeth of the driving wheel 46.

The rail 50 also supports a carriage 55, adapted to slide with a minimum of friction over the said rail 50, and is provided with a small contact-maker 56 associated with a push-member 57 engaging the helical groove 48 in the drum. When the push-member 57 is depressed, said contact maker 56 breaks the connection between two cooperating contact-pieces connected respectively through the yielding flexible wires 58 with a reversing switch 60 adapted to act on the general switch of the machine, which is not illustrated, and to which reversing switch are connected the cable 19, connecting the machine with the main supply 25, and the general feeding cable 61.

The reversing switch 60 is designed so that the succesive operations of the contact-maker 56 produce alternately the closing and the opening of the general switch.

In the bottom of the helical groove 48 is formed a continuous series of equidistant openings 62, a selected number of which may be engaged by projecting plugs. In the case where each convolution of said helical groove has a development of 30 mm., it is possible to provide openings spaced by 5 mm. apart so as to obtain 60 openings per convolution; consequently, an opening will register with the push-member 57 every minute. A scale of minutes 64 will allow an easy identification, as to time, of passage, of the different openings in front of the push-member.

During operation, the drum 47 is driven at the constant speed of one revolution per hour so as to produce, through a cam action of the left-hand side of the helical groove on the push-member 57 of the contact-maker 56, a constant progression of the sliding carriage 55 along the rail 50. Each time a projecting plug 63 engages the underside of the push-member 57, the contact-maker opens and produces through the agency of the reversing switch 60 a reversal of the condition of the general switch.

It is apparent that the chronometric circuit-breaker thus described allows, with an accuracy of the order of 1 minute, any desired sequence of operations in the automatic working of the machine.

In order to provide for the preliminary adjustment of the chronometric circuit-breaker, and more particularly to obtain coincidence between the angular setting of the drum 47 and of that of the hands of the dial, the drum may be easily shifted away from its driving wheel 46, after release and raising of the rail 50, and return the drum in a different relative position of engagement with the driving wheel 46.

The drum may advantageously be of light weight and made of molded plastic material associated with a scale-carrying perforated and grooved section formed in its developed state by a rectangular sheet of flexible material which is subsequently wound and glued over a cylindrical carrier drum.

I will now describe, with reference to Figs. 4 and 5, an embodiment of a control-bridge for my improved machine including a magnetophone of the type where the release of the different operations is performed through the depression of keys requiring the application of comparatively large forces.

The control bridge 70 is arranged above the keyboard controlling the magnetophone 1 and of which only the keys L, S and R are shown, which latter keys control respectively when depressed the reading, the stopping and the speedy return or rewinding of the record carrier. This magnetophone is hereinabove of the type illustrated hereinabove in Fig. 1 and it is equipped with two micrometric switches 13 and 14, as illustrated in Fig. 5. These switches, the positions of which are adjustable along the path of the metering slider 4 referred to hereinabove on the magnetophone, are controlled by said slider when the latter reaches respectively the beginning and the end of the record to be reproduced. These switches are normally closed in the present case and open only when they are shifted by the slider.

The bridge 70 includes a control motor 71 provided with a speed reducer and driving a shaft 72 to which are keyed three cams 73, 74 and 75 and to the end of which is secured a rotary contact-making plate illustrated diagrammatically at 80. The cams 73, 74 and 75 actuate respectively the push-members 76, 77 and 78 arranged in registry with the keys L, S and R, while return springs 79 urge said push-members upwardly into contact with the corresponding cams.

In the position illustrated for the shaft 72, the cam 73 depresses through the agency of the push-member 76 the reading key L. When the motor 71 is energized, it drives the shaft 72 in the direction of the arrow F and when the projection on the cam 73 recedes so as to release the key L, one of the two diametrically opposed projections on the cam 74 engages through the cooperating push-member 77 the stopping key S and depresses it. After a further rotation of about one revolution, the returning cam 75 provided with a single projection as in the case of the cam 73 depresses the key L. The release of said key after the receding movement of the cam 75 is also followed by the operation of the key S which is depressed by the second projection on the cam 74.

The contact-making plate 80 fitted at the end of the control-shaft 72 may be of the roller-carrying type, in which case the movable roller illustrated diagrammatically by the arm 81 engages selectively the three contact-pieces KL, KS and KR. These contact-pieces which are normally open close respectively when the corresponding keys L, S and R are depressed. There is however no contact-piece corresponding to that projection on the cam 74 which is operative immediately after operation of the reading cam 73 engaging the key L through its projection and push-member 76.

As apparent from an inspection of the wiring diagram of Fig. 5, the control-motor 71 is fed from a main supply 82 through the agency of the switch 83 which closes the circuit when the relay 84 is inoperative. The winding energizing said relay 84 is fed from a supply 85 of rectified low voltage current. This feeding of said winding may be performed by any one of a plurality of parallel wirings. The first wiring passes through a switch 86 which is normally closed and which is controlled by the chronometric circuit-breaker associated with the magnetophone so as to be opened by said circuit-breaker within the period during which the magnetophone is to be operative; said switch 86 is in series with the switch KS which is normally open. The second wiring passes through the contact-piece KL which is normally open and the normally closed switch 14 which opens at the end of the record. The third wiring passes through the switch 13 which is normally closed and which opens at the beginning of the record and through the normally open switch KR. It will be apparent from the preceding disclosure that the switches KL and KR can never close simultaneously.

The operation of the arrangement which has just been described is as follows:

Assuming that the metering slider of the magnetophone is in the position corresponding to a moment just prior to a reading, the switch 13 corresponding to said beginning is open. If the reading cam 73 is not yet in the position illustrated in Fig. 4, for which it depresses the reading key L, the switch KL is open. It is also assumed that the switch 86 is open by reason of the operativeness of the chronometric circuit-breaker. The three wiring circuits feeding the relay 84 are thus broken so that the switch 83 remains closed and the control motor 71 is fed by supply 82. The control shaft 72 rotates until the position illustrated in Fig. 4 is reached: the reading key L being thus depressed and the reading switch KL closed, the relay 84 is fed through the switches KL and 14, so that the switch 83 opens and the control-motor 71 stops.

The reading is thus performed, the record carrier moving in front of the reading head of the magnetophone and driving along with it the metering slider. When the reading is at an end, the slider 4 engages a position registering with the switch 14 corresponding to this end, so that the latter opens and switches off the wiring circuit feeding the relay 84; consequently, the switch 83 closes again so as to feed the control motor 71 which drives the shaft 72. The reading cam 73 then recedes immediately, the stopping cam 74 depresses the key S but, since there is no corresponding switch KS, the operation of the motor continues while the record carrier is stopped. The rotation of the shaft 72 continues until the record-returning cam 75 depresses the key R. The switch KR closes simultaneously so that the relay 84 is energized by said switch through the closed switch 13 whereby the switch 73 opens and the motor 71 stops rotating. The record carrier is rewound now at a high speed and the slider 4 returns towards its starting position. When it has reached this position, the switch 13 opens and switches off the energization of the relay 84; the switch 83 opens and, the control-motor 71 being reenergized, its operation begins over again. Consequently, the record-returning cam 75 recedes while the second projection on the stopping cam 74 depresses immediately afterwards the stopping key S and closes the switch KS. The rewinding stops as a consequence of this depression of the key S while the closing of the switch KS has no effect on the relay 84 since the switch 86 controlled by the chronometric circuit-breaker is still open as long as the operative period is not at an end. In such a case, the operation continues and the shaft 72 brings the reading cam 73 into the position for depressing the reading key L and the cycle of operations begins over again in the manner described and is repeated until the active period of operation being at an end, the chronometric circuit-breaker closes the switch 86 again, so as to stop the cycle as soon as KS has been closed again.

It is apparent from the preceding description that the switch 86 has no action on the operation until the end of the high speed rewinding stage and depression of the stopping key S after the slider 4 has stopped in registry with the open switch 13. At this moment, the switch KS being closed, if the switch 86 is also closed, the relay 84 is again energized and opens the switch 83 whereby the motor 71 stops running; the operation can be resumed only when, at the beginning of a further operative period, the chronometric circuit-breaker opens again the switch 86.

It is also apparent that if the end of an inoperative period is reached during a reading or a rewinding stage, the motor 71 continues rotating until the metering slider 4 has returned into registry with the switch 13 corresponding to the beginning of the record and the stopping key has been depressed. The relay 84 being energized through the switch 86 of the chronometric circuit-breaker, the motor stops and the whole arrangement is in its inoperative position, but is ready to resume operation at the beginning of the next operative period at which time the reproduction of the record may begin without any delay.

It is to be noted that in this last embodiment the reversing switch 60 illustrated in Fig. 3 is not used.

My invention is obviously not limited to the embodiments selected and illustrated by way of example and the details of the arrangement may be modified to a large extent within the scope of the accompanying claims in accordance with the different types of magnetophones used. In particular, the control bridge illustrated in Fig. 4 is easily removable from the machine and may also be modified easily so as to suit various types of control keyboards.

What I claim is:

1. A repeater system adapted to reproduce a record section during a predetermined period, comprising a magnetophone including means for reading a record strip during its progression and means for rewinding said strip against its normal direction of progression, keys adapted to release last-mentioned record reading and rewinding means respectively, a camshaft extending over said keys, cams rigid with said camshaft and adapted to depress in succession the corresponding keys, a contact-maker controlled by the camshaft, auxiliary switches closed by said contact-maker during operation of the corresponding cams, a motor driving the camshaft to constrain the latter to enter selectively angular positions corresponding to operation of the keys releasing the record reading and rewinding means and to operation of the corresponding auxiliary switches, a circuit controlling the motor and opened in succession by the auxiliary switches upon operation of the corresponding cams to stop the motor and provide selectively continued operation of the record reading and rewinding means respectively, an adjustable independent chronometric circuit breaker, a circuit controlled by the latter and adapted to start and stop the operation of the magnetophone at predetermined moments, signalling means defining the end of the record section to be reproduced, controlled by the passage of the end of said section in front of the reading means and adapted to produce a closing of the circuit controlling the motor to make the latter bring into its operative position the cam controlling the key releasing the rewinding means and further signalling means operated upon return of the beginning of the return of the record section to be reproduced in front of the reading means and adapted to produce a closing of the circuit controlling the motor to make the latter bring into its operative position the cam controlling the key releasing the reading means.

2. A repeater system adapted to reproduce a record section during a predetermined period, comprising a magnetophone including means for reading a record strip during its progression and means for rewinding said strip against its normal direction of progression, keys adapted to release last-mentioned record reading and rewinding means respectively, a camshaft extending over said keys, cams rigid with said camshaft and adapted to depress in succession the corresponding keys, a contact-maker controlled by the camshaft, auxiliary switches closed by said contact-maker during operation of the corresponding cams, a motor driving the camshaft to constrain the latter to enter selectively angular positions corresponding to operation of the keys releasing the record reading and rewinding means and to operation of the corresponding auxiliary switches, a circuit controlling the motor and including a supply of current and a switch, means controlling said switch and controlled by the auxiliary switches upon operation of the corresponding cams to stop the motor and provide selectively continued operation of the record reading and rewinding means respectively, an adjustable independent chronometric circuit breaker, a circuit controlled by the latter and adapted to start and stop the operation of the magnetophone at predetermined moments, signalling means defining the end of the record section to be reproduced, controlled by the passage of the end of said section in front of the reading means and adapted to produce a closing of the circuit controlling the motor to make the latter bring into its operative position the cam controlling the key releasing the rewinding means and further signalling means operated upon return of the beginning of the record of the record section to be reproduced in front of the reading means and adapted to produce a closing of the circuit controlling the motor to make the latter bring into its operative position the cam controlling the key releasing the reading means.

3. A repeater system adapted to reproduce a record section during a predetermined period, comprising a magnetophone including means for reading a record strip during its progression and means for rewinding said strip against its normal direction of progression, keys adapted to release last-mentioned record reading and rewinding means respectively, a camshaft extending over said keys, cams rigid with said camshaft and adapted to depress in succession the corresponding keys, a contact maker controlled by the camshaft, auxiliary switches closed by said contact-maker during operation of the corresponding cams, a motor driving the camshaft to constrain the latter to enter selectively angular positions corresponding to operation of the keys releasing the record reading and rewinding means and to operation of the corresponding auxiliary switches, a circuit controlling the motor, a switch controlling the motor-controlling circuit, a relay controlling last-mentioned switch to open said motor-controlling circuit upon operation of the auxiliary switches to stop the motor and provide selectively continued operation of the record reading and rewinding means respectively, an adjustable independent chronometric circuit breaker, a circuit, a switch controlled by the circuit-breaker, a circuit controlled by said switch and adapted to start and stop the operation of the magnetophone at predetermined moments, a slideway associated with the elementary magnetophone, a slider adapted to move over said slideway in either direction under the action of the movement of the record carrier in the corresponding direction, two switches adjustably set at selected points of a path parallel with the slideway to register with predetermined points of said slideway and to be operated by said movable slider when reaching last-mentioned points respectively, three parallel circuit sections controlling the above-mentioned relay and including respectively for the first circuit section the switch controlled by the chronometric circuit-breaker to open during a predetermined period and to thereby operate the relay and close the motor-controlling circuit for the second circuit section the auxiliary switch operated together with the cam actuating the key releasing the reading means in series with the switch controlled by the slider at the end of the reading of the record section to be reproduced and for the third circuit section the switch operated together with the key releasing the rewinding means in series with the switch operated at the end of the rewinding operation.

4. A repeater system adapted to reproduce a record section during a predetermined period, comprising a magnetophone including means for reading a record strip during its progression, means for stopping this strip and means for rewinding said strip against its normal direction of progression, keys adapted to release last-mentioned record reading, stopping and rewinding means respectively, a camshaft extending over said keys, cams rigid with said camshaft and adapted to depress in succession the corresponding keys, a contact-maker controlled by the camshaft, auxiliary switches closed by said contact-maker during operation of the corresponding cams, a motor driving the camshaft to constrain the latter to enter selectively angular positions corresponding to operation of the keys releasing the record reading, stopping and rewinding means and to operation of the corresponding auxiliary switches, a circuit controlling the motor, a switch controlling the motor-controlling circuit, a relay controlling last-mentioned switch to open said motor-controlling circuit upon operation of the auxiliary switches to stop the motor and provide selectively continued operation of the record reading, stopping and rewinding means respectively, an adjustable independent chronometric circuit-breaker, a circuit, a switch controlled by the circuit-breaker, a circuit controlled by said switch and adapted to start and stop the operation of the magnetophone at predetermined moments, a slideway associated with the elementary magnetophone, a slider adapted to move over said slideway in either direction under the action of the movement of the record-carrier in the corresponding direction, two switches adjustably set at selected points of a path parallel with the slideway to register with predetermined points of said slideway and to be operated by said movable slider when reaching last-mentioned points respectively, three parallel circuit sections controlling the above-mentioned relay and including respectively for the first circuit section a switch closed upon release of the stopping means by the co-operating cam in series with the switch controlled by the chronometric circuit-breaker to open during a predetermined period and to thereby operate the relay and close the motor-controlling circuit, for the second circuit section the auxiliary switch operated together with the cam actuating the key releasing the reading means in series with the switch controlled by the slider at the end of the reading of the record section to be reproduced and for the third circuit section the switch operated together with the key releasing the rewinding means in series with the switch operated at the end of the rewinding operation.

5. A repeater system adapted to reproduce a record section during a predetermined period comprising a magnetophone including means for reading a record strip during its progression, means for stopping this strip and means for rewinding said strip against its normal direction of progression, keys adapted to release last-mentioned record reading, stopping and rewinding means respectively, a camshaft extending over said keys, cams rigid with said camshaft and adapted to depress in succession the corresponding keys, a contact-maker controlled by the camshaft, auxiliary switches closed by said contact-maker during operation of the corresponding cams, a motor driving the camshaft to constrain the latter to enter selectively angular positions corresponding to operation of the keys releasing the record reading, stopping and rewinding means and to operation of the corresponding auxiliary switches, a circuit controlling the motor, a switch controlling the motor-controlling circuit, a relay controlling last-mentioned switch to open said motor-controlling circuit upon operation of the auxiliary switches to stop the motor and provide selectively continued operation of the record reading, stopping and rewinding means respectively, an adjustable independent chronometric circuit-breaker, a circuit, a switch controlled by the circuit-breaker, a circuit controlled by said switch and adapted to start and stop the operation of the magnetophone at predetermined moments, a slideway associated with the elementary magnetophone, a slider adapted to move over said slideway in either direction under the action of the movement of the record-carrier in the corresponding direction, two switches adjustably set at selected points of a path parallel with the slideway to register with predetermined points of said slideway and to be operated by said movable slider when reaching last-mentioned points respectively, three parallel circuit sections controlling the above-mentioned relay and including respectively for the first circuit section a switch closed upon release of the stopping means by the cooperating cam immediately upon release of the reading means by said cooperating cam in series with the switch controlled by the chronometric circuit-breaker to open during a predetermined period and to thereby operate the relay and close the motor-controlling circuit, for the second circuit section the auxiliary switch operated together with the cam actuating the key releasing the reading means in series with the switch controlled by the slider at the end of the reading of the record section to be reproduced and for the third circuit section the switch operated together with the key releasing the rewinding means in series with the switch operated at the end of the rewinding operation.

6. In combination with a magnetophone including means for reading, returning and stopping the record strips, keys controlling said means, a removable bridge adapted to be fitted over said keys and including a camshaft extending over said keys, cams rigid with said camshaft and adapted to depress in succession the corresponding keys, a contact-maker controlled by the camshaft, auxiliary switches closed by said contact-maker during operation of the corresponding cams, a motor driving the camshaft to constrain the latter to enter selectively angular positions corresponding to operation of the keys releasing the record reading, stopping and rewinding means and to operation of the corresponding auxiliary switches, a circuit controlling the motor, a switch controlling the motor-controlling circuit, a relay controlling last-mentioned switch to open said motor-controlling circuit upon operation of the auxiliary switches to stop the motor and provide selectively continued operation of the record reading, stopping and rewinding means respectively.

References Cited in the file of this patent

UNITED STATES PATENTS

| | | |
|---|---|---|
| 2,530,076 | Peterson | Nov. 14, 1950 |
| 2,535,497 | Jones | Dec. 26, 1950 |
| 2,561,602 | Valentino et al. | July 24, 1951 |
| 2,633,503 | Camras | Mar. 31, 1953 |
| 2,694,110 | Roberts | Nov. 9, 1954 |
| 2,776,341 | Peterson | Jan. 1, 1957 |
| 2,779,826 | Scott | Jan. 29, 1957 |